United States Patent
Tellez et al.

(10) Patent No.: US 10,227,524 B2
(45) Date of Patent: Mar. 12, 2019

(54) FOAM COMPOSITION

(71) Applicant: Halliburton Energy Services, Inc., Houston, TX (US)

(72) Inventors: Jonnathan Ricardo Tellez, Ciudad del Carmen (MX); Ariadne Dianney Rios, Ciudad del Carmen (MX); Marisol Mendez, Ciudad del Carmen (MX); Omar Odin Davila, Ciudad del Carmen (MX); Carmen Josefina Ramirez, Ciudad del Carmen (MX)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/506,165

(22) PCT Filed: Oct. 27, 2014

(86) PCT No.: PCT/US2014/062417
§ 371 (c)(1),
(2) Date: Feb. 23, 2017

(87) PCT Pub. No.: WO2016/068850
PCT Pub. Date: May 6, 2016

(65) Prior Publication Data
US 2017/0240804 A1    Aug. 24, 2017

(51) Int. Cl.
*E21B 43/22*    (2006.01)
*E21B 43/26*    (2006.01)
(Continued)

(52) U.S. Cl.
CPC .............. *C09K 8/703* (2013.01); *C04B 38/02* (2013.01); *C09K 8/38* (2013.01); *C09K 8/42* (2013.01); *C09K 8/46* (2013.01); *C09K 8/473* (2013.01); *C09K 8/536* (2013.01); *C09K 8/602* (2013.01); *C09K 8/604* (2013.01); *C09K 8/74* (2013.01); *C09K 8/80* (2013.01); *C09K 8/94* (2013.01);
(Continued)

(58) Field of Classification Search
CPC .......... C09K 8/685; C09K 8/68; C09K 8/512; C09K 8/035; C09K 8/80; C09K 8/703; C09K 8/887; C09K 8/62; C09K 8/90; E21B 43/26; E21B 43/267; E21B 21/00; E21B 33/138; E21B 43/16
See application file for complete search history.

(56) References Cited

U.S. PATENT DOCUMENTS 7,445,670 B2    11/2008    Lewis et al.
8,689,870 B2    4/2014    Bray et al.
(Continued)

OTHER PUBLICATIONS

International Search Report and Written Opinion issued in corresponding PCT application No. PCT/US2014/062417, dated Jun. 29, 2015, 15 pgs.
(Continued)

*Primary Examiner* — Zakiya W Bates
(74) *Attorney, Agent, or Firm* — Chamberlain Hrdlicka

(57) ABSTRACT

Foam compositions and methods of using the foam compositions for treatment of subterranean formations. A method of treating a subterranean formation including placing a foam composition in the subterranean formation. The foam composition can include a blowing agent and a surfactant. The foam composition can include at least one of a) a foam agent including an alkoxylated alcohol ether sulfate, and b) a polysaccharide foam stabilizer.

20 Claims, 1 Drawing Sheet

(51) Int. Cl.

| | |
|---|---|
| *C09K 8/68* | (2006.01) |
| *C09K 8/70* | (2006.01) |
| *C09K 8/38* | (2006.01) |
| *C09K 8/46* | (2006.01) |
| *C09K 8/60* | (2006.01) |
| *C09K 8/94* | (2006.01) |
| *C04B 38/02* | (2006.01) |
| *C09K 8/473* | (2006.01) |
| *C09K 8/536* | (2006.01) |
| *C09K 8/42* | (2006.01) |
| *C09K 8/74* | (2006.01) |
| *C09K 8/80* | (2006.01) |
| *E21B 37/06* | (2006.01) |
| *E21B 43/267* | (2006.01) |

(52) U.S. Cl.
CPC ............. *E21B 37/06* (2013.01); *E21B 43/26* (2013.01); *E21B 43/267* (2013.01)

(56) References Cited

U.S. PATENT DOCUMENTS

2008/0302570 A1 12/2008 Deboer
2009/0023613 A1 1/2009 Li et al.
2009/0181865 A1 7/2009 Dessinges et al.

OTHER PUBLICATIONS

Anonymous, "DuraKleen Service Long-Term Solution for Removing Asphaltene Deposits," Halliburton, 2005: pp. 1-12.
Van Domelen et al., "An Innovative Solvent-Water Emulsion for the Removal of Asphaltene Deposits in Oil and Gas Wells," Fuel, Halliburton, Jan. 2007: pp. 1-5.
Anonymous, Paper H05347: "DuraKleen Service Long-Term Solution for Removing Asphaltene Deposits," Stimulation, Halliburton Communications, Feb. 2007: pp. 1-2.
Lightford et al., SPE 101022: "Development and Field Use of a Novel Solvent-Water Emulsion for the Removal of Asphaltene Deposits in Fractured Carbonate Formations," SPE International, 206: pp. 1-19.

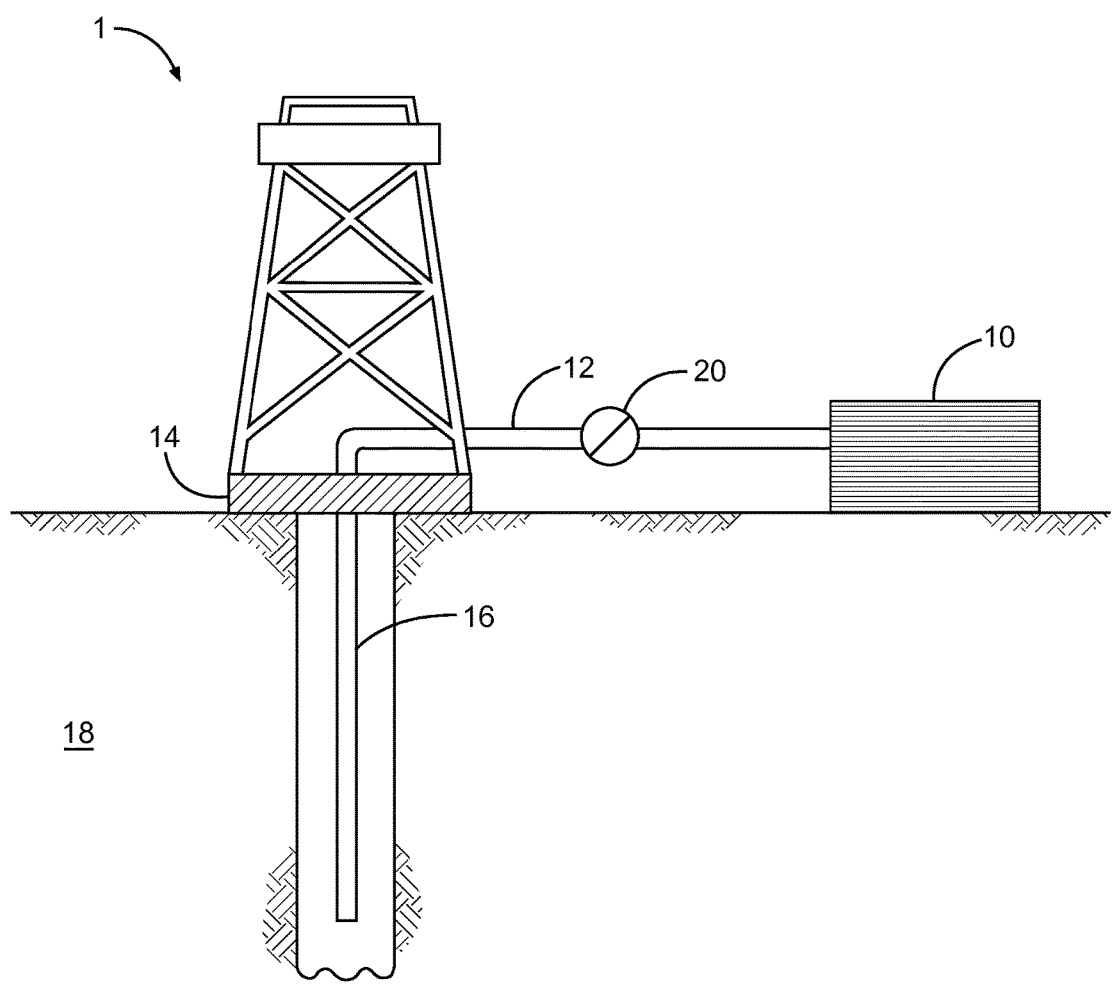

FOAM COMPOSITION

BACKGROUND

In oil wells with high amounts of hydrocarbon deposits, clean-up is needed to restore production. However, efficient removal of hydrocarbon deposits can be difficult, especially in hard-to-reach areas.

BRIEF DESCRIPTION OF THE FIGURES

The drawings illustrate generally, by way of example, but not by way of limitation, various embodiments discussed in the present document.

FIG. 1 illustrates a system or apparatus for delivering a composition to a subterranean formation, in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neo-pentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing three or more ring members, of which one or more is a heteroatom such as, but not limited to, N, O, and S.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways. A subterranean formation can include a reservoir.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

The polymers described herein can terminate in any suitable way. In some embodiments, the polymers can terminate with an end group that is independently chosen from a suitable polymerization initiator, —H, —OH, a substituted or unsubstituted $(C_1-C_{20})$hydrocarbyl (e.g., $(C_1-C_{10})$alkyl or $(C_6-C_{20})$aryl) at least one of interrupted with 0, 1, 2, or 3 groups independently substituted from —O—, substituted or unsubstituted —NH—, and —S—, a poly(substituted or unsubstituted $(C_1-C_{20})$hydrocarbyloxy), and a poly(substituted or unsubstituted $(C_1-C_{20})$hydrocarbylamino).

In various embodiments, the present invention provides a method of treating a subterranean formation. The method includes placing in a subterranean formation a foam composition. The foam composition includes a blowing agent and a surfactant. The foam composition also includes at least one of a) a foam agent including an alkoxylated alcohol ether sulfate, and b) a polysaccharide foam stabilizer.

In various embodiments, the present invention provides a method of treating a subterranean formation. The method includes placing in a subterranean formation a form composition. The about 0.01 wt % to about 10 wt % of the foam composition is an ethoxylated sorbitol ester surfactant, wherein about 16% to about 100% of the alcohol units are ethoxylated, and wherein about 0% to about 84% of the alcohol units are esterified with independently selected ($C_5$-$C_{50}$)fatty acids. About 0.1 wt % to about 20 wt % of the foam composition is a foam agent including an ammonium salt of an ethoxylated ($C_6$-$C_{10}$)alcohol ether sulfate. About 1 wt % to about 30 wt % of the composition is a polysaccharide foam stabilizer. About 50 wt % to about 90 wt % of the composition is a carrier fluid. About 10 vol % to about 90 vol % of the composition is a blowing agent.

In various embodiments, the present invention provides a system. The system includes a foam composition that includes a blowing agent and a surfactant. The foam composition includes a blowing agent and a surfactant. The foam composition also includes at least one of a) a foam agent including an alkoxylated alcohol ether sulfate, and b) a polysaccharide foam stabilizer. The system also includes a subterranean formation including the composition therein.

In various embodiments, the present invention provides a foam composition for treatment of a subterranean formation. The foam composition includes a blowing agent and a surfactant. The foam composition also includes at least one of a) a foam agent including an alkoxylated alcohol ether sulfate, and b) a polysaccharide foam stabilizer.

In various embodiments, the present invention provides a method of preparing a composition for treatment of a subterranean formation. The method includes forming a foam composition. The foam composition also includes at least one of a) a foam agent including an alkoxylated alcohol ether sulfate, and b) a polysaccharide foam stabilizer.

In various embodiments, the foam composition and methods of using the same provide certain advantages over other foam compositions, methods of using the same, and over other methods for performing clean-up procedures on subterranean formations. For example, in various embodiments, the foam composition can reach areas that are hard to reach via other methods and compositions. In some embodiments, the foam composition can have a higher solvent capacity than other compositions for clean-up procedures. In some embodiments, the foam composition has higher wettability with the subterranean formation than other compositions. In various embodiments, after performing a clean-up procedure, the foam composition leaves the subterranean formation more water-wettable than other compositions and methods. In various embodiments, the foam composition has a lower density than other compositions for performing clean-up. In various embodiments, the high wettability of the foam composition in combination with the low density can allow the foam composition to reach areas of the subterranean formation that are difficult to reach using other compositions or methods. In various embodiments, the foam composition can be more effective and efficient for at least one of breaking emulsions and dissolving hydrocarbon deposits such as asphaltic deposits as compared to other compositions.

Method of Treating a Subterranean Formation.

In some embodiments, the present invention provides a method of treating a subterranean formation. The method includes placing a foam composition in a subterranean formation. The foam composition can include a blowing agent and a surfactant. The foam composition can also include at least one of a) a foam agent including an alkoxylated alcohol ether sulfate, and b) a polysaccharide foam stabilizer.

The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the foam composition with or placing the composition in at least one of a fracture, at least a part of an area surrounding a fracture, a flow pathway, an area surrounding a flow pathway, and an area desired to be fractured. The placing of the foam composition in the subterranean formation can be any suitable placing and can include any suitable contacting between the subterranean formation and the foam composition. The placing of the foam composition in the subterranean formation can include at least partially depositing the foam composition in a fracture, flow pathway, or area surrounding the same. In some embodiments, the method includes obtaining or providing the foam composition. The obtaining or providing of the composition can occur at any suitable time and at any suitable location. The obtaining or providing of the composition can occur above the surface; for example, in some embodiments, the blowing agent or other components can be added above the surface such that the foam composition is formed above the surface. The obtaining or providing of the composition can occur in the subterranean formation (e.g., downhole); for example, in some embodiments, the blowing agent can be added or can be activated below the surface, or other components can be added below the surface, such that the foam composition is at least partially formed below the surface.

The method can include performing a clean-up operation downhole using the foam composition. The foam composition can be placed downhole such that it contacts hydrocarbon deposits for a suitable amount of time allowing at least partially dissolution or other breakdown of the deposit. The foam composition can be washed out of the subterranean formation, such as during production or using a wash out procedure.

In various embodiments, the foam composition can be used in combination with any one of a variety of downhole operations. In some embodiments, the method can be a method of drilling, stimulation, fracturing, spotting, clean-up, completion, remedial treatment, applying a pill, acidizing, cementing, packing, spotting, or a combination thereof. The method can include performing a stimulation treatment at least one of before, during, and after placing the foam composition in the subterranean formation in the fracture, flow pathway, or area surrounding the same. The stimulation treatment can be, for example, at least one of perforating, acidizing, injecting of cleaning fluids, propellant stimulation, and hydraulic fracturing.

In various examples, the blowing agent can contribute a small amount of weight to the foam composition. Thus, for components of the foam composition described herein in wt %, a form-forming composition not including any blowing agent can be used to form the foam composition, wherein the form-forming composition can have any suitable wt % of any component described as present in the foam composition. As used herein, any wt % described can alternatively be expressed as a weight/volume percent that can be the same or approximately the same.

Surfactant.

In various embodiments, the foam composition can include a surfactant. The surfactant can be any suitable surfactant. The surfactant can be any suitable proportion of the foam composition, such as about 0.01 wt % to about 10 wt %, about 0.1 wt % to about 2 wt %, or about 0.01 wt % or less, or about 0.05 wt %, 0.1, 0.2, 0.25, 0.3, 0.35, 0.4, 0.45, 0.5, 0.55, 0.6, 0.66, 0.7, 0.75, 0.8, 0.9, 1, 1.5, 2, 2.5, 3, 3.5, 4, 4.5, 5, 6, 7, 8, 9, or about 10 wt % or more.

In some embodiments, the surfactant is at least one of a cationic surfactant, an anionic surfactant, and a non-ionic surfactant. In some embodiments, the ionic groups of the surfactant can include counterions, such that the overall charge of the ionic groups is neutral, whereas in other embodiments, no counterion can be present for one or more ionic groups, such that the overall charge of the one or more ionic groups is not neutral.

In one example, the surfactant can be a non-ionic surfactant. Examples of non-ionic surfactants can include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, and mixtures, copolymers or reaction products thereof. In one example, the surfactant is polyglycol-modified trimethylsilylated silicate surfactant. Examples of suitable non-ionic surfactants can include, but are not limited to, condensates of ethylene oxide with long chain fatty alcohols or fatty acids such as a $(C_{12-16})$alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, ethylene glycol propylene glycol copolymers and alkylpolysaccharides, polymeric surfactants such as polyvinyl alcohol (PVA) and polyvinylmethylether. In certain embodiments, the surfactant is a polyoxyethylene fatty alcohol or mixture of polyoxyethylene fatty alcohols. In other embodiments, the surfactant is an aqueous dispersion of a polyoxyethylene fatty alcohol or mixture of polyoxyethylene fatty alcohols. In some examples, suitable non-ionic surfactants can include at least one of an alkyl polyglycoside, a sorbitan ester, a methyl glucoside ester, an amine ethoxylate, a diamine ethoxylate, a polyglycerol ester, an alkyl ethoxylate, an alcohol that has been at least one of polypropoxylated and polyethoxylated, any derivative thereof, or any combination thereof.

Examples of suitable anionic surfactants can include, but are not limited to, alkyl sulphates such as lauryl sulphate, polymers such as acrylates/$C_{10-30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulphate esters of monoalkyl polyoxyethylene ethers; alkylnapthylsulfonic acid; alkali metal sulfoccinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulphates, ester sulphates, and alkarylsulfonates. Anionic surfactants can include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Suitable cationic surfactants can include at least one of an arginine methyl ester, an alkanolamine, an alkylenediamide, an alkyl ester sulfonate, an alkyl ether sulfonate, an alkyl ether sulfate, an alkali metal alkyl sulfate, an alkyl or alkylaryl sulfonate, a sulfosuccinate, an alkyl or alkylaryl disulfonate, an alkyl disulfate, an alcohol polypropoxylated or polyethoxylated sulfates, a taurate, an amine oxide, an alkylamine oxide, an ethoxylated amide, an alkoxylated fatty acid, an alkoxylated alcohol, an ethoxylated fatty amine, an ethoxylated alkyl amine, a betaine, a modified betaine, an alkylamidobetaine, a quaternary ammonium compound, any derivative thereof, and any combination thereof. Examples of suitable cationic surfactants can include quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, and quaternary ammonium bases of benzimidazolines and poly(ethoxylated/propoxylated) amines.

In some embodiments, the surfactant can be selected from Tergitol™ 15-s-3, Tergitol™ 15-s-40, sorbitan monooleate, polyglycol-modified trimethsilylated silicate, polyglycol-modified siloxanes, polyglycol-modified silicas, ethoxylated quaternary ammonium salt solutions, cetyltrimethylammonium chloride or bromide solutions, an ethoxylated nonyl phenol phosphate ester, and a $(C_{12}-C_{22})$alkyl phosphonate. In some examples, the surfactant can be a sulfonate methyl ester, a hydrolyzed keratin, a polyoxyethylene sorbitan monopalmitate, a polyoxyethylene sorbitan monostearate, a polyoxyethylene sorbitan monooleate, a linear alcohol alkoxylate, an alkyl ether sulfate, dodecylbenzene sulfonic acid, a linear nonyl-phenol, dioxane, ethylene oxide, polyethylene glycol, an ethoxylated castor oil, dipalmitoyl-phosphatidylcholine, sodium 4-(1' heptylnonyl)benzenesulfonate, polyoxyethylene nonyl phenyl ether, sodium dioctyl sulphosuccinate, tetraethyleneglycoldodecylether, sodium octylbenzenesulfonate, sodium hexadecyl sulfate, sodium laureth sulfate, decylamine oxide, dodecylamine betaine, dodecylamine oxide, N,N,N-trimethyl-1-octadecammonium chloride, xylenesulfonate and salts thereof (e.g., sodium xylene sulfonate), sodium dodecyl sulfate, cetyltrimethylammonium bromide, any derivative thereof, or any combination thereof. The surfactant can be at least one of alkyl propoxy-ethoxysulfonate, alkyl propoxy-ethoxysulfate, alkylaryl-propoxy-ethoxysulfonate, a mixture of an ammonium salt of an alkyl ether sulfate, cocoamidopropyl betaine, cocoamidopropyl dimethylamine oxide, an ethoxylated alcohol ether sulfate, an alkyl or alkene amidopropyl betaine, an alkyl or alkene dimethylamine oxide, an alphaolefinic sulfonate surfactant, any derivative thereof, and any combination thereof. Suitable surfactants may also include polymeric surfactants, block copolymer surfactants, di-block polymer surfactants, hydrophobically modified surfactants, fluoro-surfactants, and surfactants containing a non-ionic spacer-arm central extension and an ionic or nonionic polar group. In some examples, the non-ionic spacer-arm central extension can be the result of at least one of polypropoxylation and polyethoxylation.

In various embodiments, the surfactant is at least one of a substituted or unsubstituted ($C_5$-$C_{50}$)hydrocarbylsulfate salt, a substituted or unsubstituted ($C_5$-$C_{50}$)hydrocarbylsulfate ($C_1$-$C_{20}$)hydrocarbyl ester wherein the ($C_1$-$C_{20}$)hydrocarbyl is substituted or unsubstituted, and a substituted or unsubstituted ($C_5$-$C_{50}$)hydrocarbylbisulfate. The surfactant can be at least one of a ($C_5$-$C_{20}$)alkylsulfate salt, a ($C_5$-$C_{20}$)alkylsulfate ($C_1$-$C_{20}$)alkyl ester and a ($C_5$-$C_{20}$)alkylbisulfate. In various embodiments the surfactant is a ($C_8$-$C_{15}$)alkylsulfate salt, wherein the counterion can be any suitable counterion, such as $Na^+$, $K^+$, $Li^+$, $H^+$, $Zn^+$, $NH_4^+$, $Ca^{2+}$, $Mg^{2+}$, $Zn^{2+}$, or $Al^{3+}$. In some embodiments, the surfactant is a ($C_8$-$C_{15}$)alkylsulfate salt sodium salt. In some embodiments, the surfactant is sodium dodecyl sulfate.

In various embodiments, the surfactant is a ($C_5$-$C_{50}$) hydrocarbyltri(($C_1$-$C_{50}$)hydrocarbyl)ammonium salt, wherein each ($C_5$-$C_{50}$)hydrocarbyl is independently selected. The counterion can be any suitable counterion, such as $Na^+$, $K^+$, $Li^+$, $H^+$, $Zn^+$, $NH_4^+$, $Ca^{2+}$, $Mg^{2+}$, $Zn^{2+}$, or $Al^{3+}$. The surfactant can be a ($C_5$-$C_{50}$)alkyltri(($C_1$-$C_{20}$) alkyl)ammonium salt, wherein each ($C_5$-$C_{50}$)alkyl is independently selected. The surfactant can be a ($C_{10}$-$C_{30}$)alkyltri (($C_1$-$C_{10}$)alkyl)ammonium halide salt, wherein each ($C_{10}$-$C_{30}$)alkyl is independently selected. The surfactant can be cetyltrimethylammonium bromide.

In some embodiments, the surfactant can be an alkylated polyol, which can be optionally esterified. In some embodiments, the surfactant is a ($C_1$-$C_{10}$)alkylated ($C_2$-$C_{20}$)hydrocarbon polyol that is optionally esterified (e.g., wherein the ($C_2$-$C_{20}$)polyol has at least one —OH unit wherein the H of the —OH group is replaced with an (($C_1$-$C_{10}$)alkyloxy)$_n$- group having degree of polymerization n which can be any suitable value such as 1-30, 1-10, or 1, 2, 3, 4, 5, 6, 7, 8, 9, or 10 or more), wherein the ($C_2$-$C_{20}$)hydrocarbon and the ($C_1$-$C_{10}$)alkyl are each independently substituted or unsubstituted, wherein about 1% to about 99% of the alcohol units of the polyol are alkylated (e.g., about 1%, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 96, 98, or 99%), wherein about 0% to about 100% of the alcohol units are esterified (e.g., about 1%, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 96, 98, or 99%) with independently selected ($C_5$-$C_{50}$)fatty acids, wherein each ($C_5$-$C_{50}$)fatty acid is independently substituted or unsubstituted. The surfactant can be a ($C_1$-$C_4$)alkylated ($C_4$-$C_{10}$)hydrocarbon polyol, wherein about 1% to about 99% of the alcohol units of the polyol are alkylated, and wherein about 1% to about 99% of the alcohol units are esterified with independently selected ($C_5$-$C_{50}$) fatty acids. The surfactant can be an ethoxylated sorbitol ester, wherein about 16% to about 84% of the alcohol units are ethoxylated (e.g., 1 alcohol unit, 2, 3, 4, or 5 alcohol units), wherein about 16% to about 84% of the alcohol units are esterified with independently selected ($C_5$-$C_{50}$)fatty acids (e.g., 1 alcohol unit, 2, 3, 4, or 5 alcohol units).

Foam Agent.

In various embodiments, the foam composition can include a foam agent. In some embodiments, the foam composition is free of a foam agent. The foam agent can be any one or more suitable foam agents. Any suitable proportion of the composition can be the foam agent, such as about 0.1 wt % to about 20 wt % of the composition, about 1 wt % to about 5 wt %, about 0.1 wt % or less, or about 0.5 wt %, 1, 2, 3, 4, 5, 6, 8, 10, 12, 14, 16, 18, or about 20 wt % or more of the composition.

In various embodiments, the foam agent can include an alkoxylated alcohol ether sulfate. The alkoxylated alcohol ether sulfate can be a ($C_1$-$C_{10}$)alkoxylated ($C_1$-$C_{20}$)alcohol ether sulfate salt foam agent (e.g., a ($C_1$-$C_{20}$)alcohol having an the H of an —OH group replaced by an —(($C_1$-$C_{10}$) alkoxy)$_n$-$S(O)_2O^-$ group, wherein n is the degree of polymerization and can be any suitable value such as 1-30, 1-10, or 1, 2, 3, 4, 5, 6, 7, 8, 9, or 10 or more), wherein the ($C_1$-$C_{10}$)alkoxy group and the ($C_1$-$C_{20}$)alcohol are each independently substituted or unsubstituted, wherein the alkoxylation includes a degree of polymerization of about 1 to about 10. The alkoxylated alcohol ether sulfate can be a ($C_2$-$C_4$)alkoxylated ($C_6$-$C_{10}$)alcohol ether sulfate salt foam agent. The alkoxylated alcohol ether sulfate can include any suitable counterion for the sulfate group, such as ammonium ($NH_4^+$), or an alkali metal such as sodium (Na+), potassium ($K^+$), lithium ($Li^+$), or can have a positive charge greater than +1, which can in some embodiments complex to multiple ionized groups, such as $Zn^{2+}$, $Al^{3+}$, or alkaline earth metals such as $Ca^{2+}$ or $Mg^{2+}$. The alkoxylated alcohol ether sulfate can be an ammonium salt of an ethoxylated ($C_6$-$C_{10}$) alcohol ether sulfate. In some embodiments, the alkoxylated alcohol ether sulfate can be about 40 wt % to about 80 wt % of the foam agent, or about 42 wt %, 44, 46, 48, 50, 52, 54, 56, 58, 60, 62, 64, 66, 68, 70, 72, 74, 76, 78, or about 80 wt %.

In some embodiments, the foam agent can include a ($C_1$-$C_{10}$)hydrocarbyl amido($C_1$-$C_5$)alkylbetaine, wherein the ($C_1$-$C_{10}$)hydrocarbyl and the ($C_1$-$C_5$)alkyl are independently substituted or unsubstituted, such as about 10 wt % to about 50 wt % of the foam composition, such as about 10 wt %, 12, 14, 16, 18, 20, 22, 24, 26, 28, 30, 32, 34, 36, 38, 40, 42, 44, 46, 48, or about 50 wt %. The foam agent can includes lauramidopropyl betaine.

In some embodiments, the foam agent includes a ($C_1$-$C_{10}$)hydrocarbyl amido($C_1$-$C_5$)alkyldimethylamine oxide, wherein the ($C_1$-$C_{10}$)hydrocarbyl and the ($C_1$-$C_5$)alkyl are independently substituted or unsubstituted, such as about 1 wt % to about 10 wt % of the foam composition, such as about 1 wt %, 2, 3, 4, 5, 6, 7, 8, 9, or about 10 wt % of the foam composition. The foam agent can include lauramidopropyl dimethylamine oxide.

Foam Stabilizer.

In various embodiments, the foam composition can include a foam stabilizer. In some embodiments, the foam composition can be free of a foam stabilizer. The foam stabilizer can be any one or more suitable foam stabilizers. The foam stabilizer can be any suitable proportion of the foam composition, such as about 1 wt % to about 30 wt % of the composition, about 10 wt % to about 20 wt %, or about 1 wt % or less, or about 2, 4, 6, 8, 9, 10, 11, 12, 13, 14, 15, 16, 17, 18, 19, 20, 21, 22, 24, 26, 28, or about 30 wt % or more of the composition.

In some embodiments, the foam stabilizer is a polysaccharide foam stabilizer. The polysaccharide foam stabilizer can have the formula $(C_6H_{10}O_5)_n$ where n is about 10 to about 10,000, or about 20 to about 5,000, or about 30 to about 4,000, or about 40 to about 3,000.

Carrier Fluid.

In various embodiments, the foam composition includes a carrier fluid. The carrier fluid can be any one or more suitable fluids. The carrier fluid can be any suitable proportion of the foam composition, such as about 1 wt % to about 95 wt % of the composition, about 50 wt % to about 90 wt % of the composition, or about 1 wt % or less, 2, 3, 4, 5, 10, 15, 20, 25, 30, 35, 40, 42, 44, 46, 48, 50, 52, 54, 56, 58, 60, 62, 64, 66, 68, 70, 72, 74, 76, 78, 80, 82, 84, 86, 88, 90, 91, 92, 93, 94, or about 95 wt % or more of the foam composition.

For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water (e.g., having any suitable amount of one or more salts dissolved therein), brine, produced water, flowback water, brackish water, and sea water.

In some embodiments, the carrier fluid includes a substituted benzene, such as at least one of xylenes and ethylbenzene, such as about 20 wt % to about 40 wt % of the composition, or about 20 wt % or less, 24, 26, 28, 30, 32, 34, 36, 38, or about 40 wt % or more. In some embodiments, the carrier fluid includes a substituted or unsubstituted nitrogen-containing ($C_1$-$C_{20}$)heterocycle, such as N-methyl pyrrolidine, such about 1 wt % to about 10 wt % of the foam composition, or about 1 wt %, 2, 3, 4, 5, 6, 7, 8, 9, or about 10 wt %. In some embodiments, the carrier fluid includes water, such as about 30 wt % to about 60 wt %, or about 30 wt %, 32, 34, 36, 38, 40, 42, 44, 46, 48, 50, 52, 54, 56, 58, or about 60 wt %.

Blowing Agent.

The foam composition can include a blowing agent. The blowing agent can be any one or any suitable combination of blowing agents. In various embodiments, the blowing agent can be about 10 vol % to about 90 vol % of the foam composition, or about 30 vol % to about 70 vol %, or about 10 vol % or less, or about 15 vol %, 20, 25, 30, 32, 34, 36, 38, 40, 41, 42, 43, 44, 45, 46, 47, 48, 49, 50, 51, 52, 53, 54, 55, 56, 57, 58, 59, 60, 62, 64, 66, 68, 70, 75, 80, 85, or about 90 vol % of the foam composition. In various embodiments, the vol % of the blowing agent in the foam can be referred to as the quality of the foam.

The blowing agent can include at least one of air, a substituted or unsubstituted branched or linear ($C_{1-5}$)alkane, ethane, propane, butane, n-butane, isobutane, pentane, isopentane, cyclopentane, halo($C_{1-5}$)alkanes, chlorofluorocarbon, CFC-11, CFC-12, hydroflurochlorocarbons, HCFC-22, HCFC-122, HCFC-124, HFC-152a, HFC-143a, HFC-134a, HCFC-141b, HCFC-142b, carbon dioxide, oxygen, hydrogen, water, and nitrogen. In some embodiments, the blowing agent is physically introduced during the manufacturing process of the foam, such as by stirring, generation of bubbles from an immersed location, blending, whisking, or any combination thereof. Blowing agents can be introduced at any suitable time during the process. For example, physical blowing agents (e.g., gases) or chemical blowing agents (e.g., materials that create gas at a later time) can be introduced during or after introduction to a subterranean formation.

In some embodiments, the blowing agent is generated via a chemical reaction of chemical blowing agents. Chemical blowing agents can be one or more solid or liquid materials that are added to the solid composition that generates the foam during the foam manufacturing process. Chemical blowing agents can react during the foam manufacturing process to form bubbles that include blowing agent. Chemical blowing agents can include any suitable chemical blowing agent. In some examples, a chemical blowing agent can be azodicarbonamide, an azodicarbonamide derivative, sodium bicarbonate, an aliphatic sulfonyl semicarbazide, p-toluenesulfonylhydrazide, p-toluenesulfonyisemicarbazide, 4,4-oxybisbenzenesulfonylhydrazide, 5-phenyltetrazole, and citric acid.

Other Components.

The foam composition, or a mixture including the foam composition, can include any suitable additional component in any suitable proportion, such that the foam composition, or mixture including the same, can be used as described herein.

In some embodiments, the foam composition includes one or more viscosifiers. The viscosifier can be any suitable viscosifier. The viscosifier can affect the viscosity of the foam composition or a solvent that contacts the foam composition at any suitable time and location. In some embodiments, the viscosifier provides an increased viscosity at least one of before injection into the subterranean formation, at the time of injection into the subterranean formation, during travel through a tubular disposed in a borehole, once the foam composition reaches a particular subterranean location, or some period of time after the foam composition reaches a particular subterranean location. In some embodiments, the viscosifier can be about 0.000.1 wt % to about 10 wt % of the foam composition, about 0.004 wt % to about 0.01 wt % of the foam composition, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the foam composition.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstitued ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the foam composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly (($C_1$-$C_{20}$)alkenyl)-substituted mono- or poly-($C_1$-$C_{20}$)alkyl ether (e.g., pentaerythritol allyl ether), and a poly($C_2$-$C_{20}$) alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the foam composition, about 0.001 wt % to about 0.01 wt %, or about 0.000.01 wt % or less, or about 0.000.05 wt %, 0.000.1, 0.000.5, 0.001, 0.005, 0.01, 0.05, 0.1, 0.5, 1, 2, 3, 4, or about 5 wt % or more.

The foam composition, or a mixture including the foam composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the foam composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition or a mixture including the same can include any suitable downhole fluid. The foam composition can be combined with any suitable downhole fluid before, during, or after the placement of the foam composition in the subterranean formation or the contacting of the foam composition and the subterranean material. In some examples, the foam composition is combined with a downhole fluid above the surface, and then the combined foam composition is placed in a subterranean formation or contacted with a subterranean material. In another example, the foam composition is injected into a subterranean formation to combine with a downhole fluid, and the combined foam composition is contacted with a subterranean material or is considered to be placed in the subterranean formation. The placement of the foam composition in the subterranean formation can include contacting the subterranean material and the mixture. Any suitable weight percent of the foam composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the foam composition or mixture including the same.

In some embodiments, the foam composition, or a mixture including the same, can include any suitable amount of any suitable material used in a downhole fluid. For example, the foam composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. Any suitable proportion of the foam composition or mixture including the foam composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the foam composition or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the foam composition in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more of the mixture.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a foam composition including a blowing agent and a surfactant. The foam composition can also include at least one of a) a foam agent including an alkoxylated alcohol ether sulfate and b) a polysaccharide foam stabilizer. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the foam composition described herein to a subterranean location and for using the foam composition therein. In various embodiments, the system or apparatus can include a pump fluidly coupled to a tubular (e.g., any suitable type of oilfield pipe, such as pipeline, drill pipe, production tubing, and the like), with the tubular containing a foam composition as described herein.

In some embodiments, the system can include a drill string disposed in a wellbore, with the drill string including a drill bit at a downhole end of the drill string. The system can also include an annulus between the drill string and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the foam composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the foam composition to the high pressure pump. In such embodiments, the low pressure pump can "step up" the pressure of the foam composition before it reaches the high pressure pump.

In some embodiments, the systems or apparatuses described herein can further include a mixing tank that is upstream of the pump and in which the foam composition is formulated. In various embodiments, the pump (e.g., a low pressure pump, a high pressure pump, or a combination thereof) can convey the foam composition from the mixing tank or other source of the foam composition to the tubular. In other embodiments, however, the foam composition can be formulated offsite and transported to a worksite, in which case the foam composition can be introduced to the tubular via the pump directly from its shipping container (e.g., a truck, a railcar, a barge, or the like) or from a transport pipeline. In either case, the foam composition can be drawn into the pump, elevated to an appropriate pressure, and then introduced into the tubular for delivery to the subterranean formation.

FIG. 1 shows an illustrative schematic of systems and apparatuses that can deliver embodiments of the foam compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the foam composition can be formulated. The foam composition can be conveyed via line 12 to wellhead 14, where the foam composition enters tubular 16, with tubular 16 extending from wellhead 14 into subterranean formation 18. Upon being ejected from tubular 16, the foam composition can subsequently penetrate into subterranean formation 18. Pump 20 can be configured to raise the pressure of the foam composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the foam composition can, in some embodiments, flow back to wellhead 14 and exit subterranean formation 18. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a foam composition for treatment of a subterranean formation. The foam composition can be any suitable foam composition that can be used to perform an embodiment of the method for treatment of a subterranean formation described herein.

For example, the foam composition can include a blowing agent and a surfactant. The foam composition can include at least one of a) a foam agent including an alkoxylated alcohol ether sulfate, and b) a polysaccharide foam stabilizer. In some embodiments, the composition further includes a downhole fluid. The downhole fluid can be any suitable downhole fluid.

Method for Preparing a Composition for Treatment of a Subterranean Formation.

In various embodiments, the present invention provides a method for preparing a foam composition for treatment of a subterranean formation. The method can be any suitable method that produces a foam composition described herein. For example, the method can include forming a foam composition including a blowing agent and a surfactant. The foam composition can include at least one of a) a foam agent including an alkoxylated alcohol ether sulfate, and b) a polysaccharide foam stabilizer.

EXAMPLES

Various embodiments of the present invention can be better understood by reference to the following Examples which are offered by way of illustration. The present invention is not limited to the Examples given herein.

Example 1

Sample Preparation

Samples 1-3 were prepared having the compositions shown in Table 1. The percents given are weight/volume % (lb/mgal). The foam agent used was a mixture of 63.3 parts by weight of an ammonium salt of an ethoxylated ($C_6$-$C_{10}$) alcohol ether sulfate, 31.7 parts by weight lauramidopropyl betaine, and 5 parts by weight lauramidopropyl dimethylamine oxide, in isopropanol (10 wt %). The polysaccharide used had the formula $(C_6H_{10}O_5)_n$, wherein $40 \leq n \leq 3000$.

| | Type of material | Sample 1 | Sample 2 | Sample 3 |
|---|---|---|---|---|
| Ethoxylated sorbitol fatty acid esters | Surfactant/ emulsifier | 0.4% | 0.5% | 0.6% |
| Polysaccharide | Foam stabilizer | 15% | 15% | 15% |
| Foam agent | Foam agent | 3% | 3% | 3% |
| Xylene/ethyl benzene 60:40 | Carrier fluid | 33% | 33% | 33% |
| N-methyl pyrrolidone | Carrier fluid | 3% | 3% | 3% |
| Sea Water | Carrier fluid | Remainder | Remainder | Remainder |

The Samples were foamed for 3 minutes at 18,000 rpm.

Example 2

Sample 2: Quality and Breaking

Foamed Sample 2 from Example 1 had a quality of 47.44%.

At a temperature of 80° C., the breaking of the foam required 3 hours and 31 minutes.

Example 3

Re-preparation of Samples and Quality

Samples 1-3 of Example 1 were prepared using the same procedure, except that the Samples were foamed for 5 minutes at 18,000 rpm.

Samples 1-3 all had qualities exceeding 50%.

Example 4

Compatibility

Samples 1-3 of Example 3 were mixed in a 1:1 vol:vol ratio with a Sihil-11 crude oil sample. The mixtures were stirred vigorously for 30 seconds, and then placed into a thermal bath at 90° C. The mixtures were left in the thermal bath for 4 hours. The mixtures were removed and filtered through a #100 mesh filter. In the case of retained solids, the solids were tested to verify that they were soluble in hot aromatic solvent.

Each of Samples 1-3 demonstrated compatibility with the crude oil sample, and did not leave behind any solids wastes that were captured by the #100 mesh filter.

Example 5

Solubility

Three mixtures were prepared, each containing 1 g solid samples of Yaxche 4 asphaltene along with 50 mL of Samples 1-3, respectively. The mixtures were placed into a thermal bath at 90° C. for one hour. The mixtures were filtered using a #100 mesh filter, the solids in the filter were dried in an oven for one hour, cooled for an hour, and then weighed. The results are illustrated in Table 2.

TABLE 2

Solubility tests.

| Type of solid | Sample | Initial weight (g) | Final weight (g) | Solubility (%) |
|---|---|---|---|---|
| Yaxche-4 asphaltene | 1 | 1.0067 | 0.2345 | 76.70 |
| | 2 | 1.0177 | 0.1958 | 80.76 |
| | 3 | 1.0083 | 0.0928 | 90.79 |

The asphaltene Yaxche-4 had solubility in excess of 75% with all the Samples, and had the highest percentage of solubility with Sample 3 (90.79%).

Example 6

Wettability

Four rock samples (10 wt % limestone, 85 wt % dolomite, 5% clay) and four metal coupons (P-110 steel, size 3 cm×3 cm) were each submerged in one of Samples 1-3 of Example 3 for 30 minutes at room temperature. The rocks and metal coupons were soaked in a crude oil sample, with the oil sample completely covering the rock or coupon. The rocks and metal coupons were then placed in water and the results were observed.

Upon placement in the water, all four of the rocks and metal coupons from each of Samples 1-3 rapidly released the crude oil, which moved toward the surface of the water and left behind a rock or a metal coupon with little to no crude oil on its surface.

Example 7

Stability

Samples 1-3 of Example 3 were held at 90° C. for 10 hours. The foam of each of the Samples had experienced total breakdown by the end of the time period.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in a subterranean formation a foam composition comprising
  a blowing agent;
  a surfactant; and
  at least one of
    a foam agent comprising an alkoxylated alcohol ether sulfate, and
    a polysaccharide foam stabilizer.

Embodiment 2 provides the method of Embodiment 1, wherein the method further comprises obtaining or providing the composition, wherein the obtaining or providing of the composition occurs above-surface.

Embodiment 3 provides the method of any one of Embodiments 1-2, wherein the method further comprises obtaining or providing the composition, wherein the obtaining or providing of the composition occurs in the subterranean formation.

Embodiment 4 provides the method of any one of Embodiments 1-3, wherein the method comprises performing a clean-up operation downhole using the foam composition.

Embodiment 5 provides the method of any one of Embodiments 1-4, wherein about 0.01 wt % to about 10 wt % of the composition is the surfactant.

Embodiment 6 provides the method of any one of Embodiments 1-5, wherein about 0.1 wt % to about 2 wt % of the composition is the surfactant.

Embodiment 7 provides the method of any one of Embodiments 1-6, wherein the surfactant is an alkylated polyol.

Embodiment 8 provides the method of any one of Embodiments 1-7, wherein the surfactant is a $(C_1-C_{10})$ alkylated $(C_2-C_{20})$hydrocarbon polyol that is optionally esterified, wherein the $(C_2-C_{20})$hydrocarbon and the $(C_1-C_{10})$alkyl are each independently substituted or unsubstituted, wherein about 1% to about 99% of the alcohol units of the polyol are alkylated, wherein about 1% to about 99% of the alcohol units are esterified with independently selected $(C_5-C_{50})$fatty acids, wherein each $(C_5-C_{50})$fatty acid is independently substituted or unsubstituted.

Embodiment 9 provides the method of any one of Embodiments 1-8, wherein the surfactant is a $(C_1-C_4)$alkylated $(C_4-C_{10})$hydrocarbon polyol, wherein about 1% to about 99% of the alcohol units of the polyol are alkylated, wherein about 1% to about 100% of the alcohol units are esterified with independently selected $(C_5-C_{50})$fatty acids.

Embodiment 10 provides the method of any one of Embodiments 1-9, wherein the surfactant is an ethoxylated sorbitol ester, wherein about 16% to about 99% of the alcohol units are ethoxylated, wherein about 1% to about 99% of the alcohol units are esterified with independently selected $(C_5-C_{50})$fatty acids.

Embodiment 11 provides the method of any one of Embodiments 1-10, wherein the foam agent is about 0.1 wt % to about 20 wt % of the composition.

Embodiment 12 provides the method of any one of Embodiments 1-11, wherein the foam agent is about 1 wt % to about 5 wt % of the composition.

Embodiment 13 provides the method of any one of Embodiments 1-12, wherein the alkoxylated alcohol ether sulfate is a $(C_1-C_{10})$alkoxylated $(C_1-C_{20})$alcohol ether sulfate salt foam agent, wherein the $(C_1-C_{10})$alkoxy group and the $(C_1-C_{20})$alcohol are each independently substituted or unsubstituted, wherein the alkoxylation comprises a degree of polymerization of about 1 to about 10.

Embodiment 14 provides the method of any one of Embodiments 1-13, wherein the alkoxylated alcohol ether sulfate is a $(C_2-C_4)$alkoxylated $(C_6-C_{10})$alcohol ether sulfate salt foam agent.

Embodiment 15 provides the method of any one of Embodiments 1-14, wherein the alkoxylated alcohol ether sulfate is an ammonium salt of an ethoxylated $(C_6-C_{10})$ alcohol ether sulfate.

Embodiment 16 provides the method of any one of Embodiments 1-15, wherein the foam agent further comprises a $(C_1-C_{10})$hydrocarbyl amido$(C_1-C_5)$alkylbetaine, wherein the $(C_1-C_{10})$hydrocarbyl and the $(C_1-C_5)$alkyl are independently substituted or unsubstituted.

Embodiment 17 provides the method of any one of Embodiments 1-16, wherein the foam agent further comprises lauramidopropyl betaine.

Embodiment 18 provides the method of any one of Embodiments 1-17, wherein the foam agent further comprises a $(C_1-C_{10})$hydrocarbyl amido$(C_1-C_5)$alkyldimethylamine oxide, wherein the $(C_1-C_{10})$hydrocarbyl and the $(C_1-C_5)$alkyl are independently substituted or unsubstituted.

Embodiment 19 provides the method of any one of Embodiments 1-18, wherein the foam agent further comprises lauramidopropyl dimethylamine oxide.

Embodiment 20 provides the method of any one of Embodiments 1-19, wherein the polysaccharide foam stabilizer is about 1 wt % to about 30 wt % of the composition.

Embodiment 21 provides the method of any one of Embodiments 1-20, wherein the polysaccharide foam stabilizer is about 10 wt % to about 20 wt % of the composition.

Embodiment 22 provides the method of any one of Embodiments 1-21, wherein the polysaccharide foam stabilizer has the formula $(C_6H_{10}O_5)_n$, wherein $10 \leq n \leq 10{,}000$.

Embodiment 23 provides the method of any one of Embodiments 1-22, wherein the polysaccharide foam stabilizer is $(C_6H_{10}O_5)_n$, wherein $40 \leq n \leq 3000$.

Embodiment 24 provides the method of any one of Embodiments 1-23, wherein the composition further comprises a carrier fluid.

Embodiment 25 provides the method of Embodiment 24, wherein the carrier fluid is about 1 wt % to about 95 wt % of the composition.

Embodiment 26 provides the method of any one of Embodiments 24-25, wherein the carrier fluid is about 50 wt % to about 90 wt % of the composition.

Embodiment 27 provides the method of any one of Embodiments 24-26, wherein the carrier fluid comprises a substituted benzene.

Embodiment 28 provides the method of any one of Embodiments 24-27, wherein the carrier fluid comprises at least one of xylenes and ethylbenzene.

Embodiment 29 provides the method of any one of Embodiments 24-28, wherein the carrier fluid comprises a substituted or unsubstituted nitrogen-containing $(C_1-C_{20})$ heterocycle.

Embodiment 30 provides the method of any one of Embodiments 24-29, wherein the carrier fluid comprises N-methyl pyrrolidine.

Embodiment 31 provides the method of any one of Embodiments 24-30, wherein the carrier fluid comprises water.

Embodiment 32 provides the method of any one of Embodiments 1-31, wherein the blowing agent is about 10 vol % to about 90 vol % of the composition.

Embodiment 33 provides the method of any one of Embodiments 1-32, wherein the blowing agent is about 30 vol % to about 70 vol % of the composition.

Embodiment 34 provides the method of any one of Embodiments 1-33, wherein the blowing agent comprises at least one of air, a substituted or unsubstituted branched or linear $(C_{1-5})$alkane, ethane, propane, butane, n-butane, isobutane, pentane, isopentane, cyclopentane, halo$(C_{1-5})$alkanes, chlorofluorocarbon, CFC-11, CFC-12, hydrofluorochlorocarbons, HCFC-22, HCFC-122, HCFC-124, HFC-152a, HFC-143a, HFC-134a, HCFC-141b, HCFC-142b, carbon dioxide, oxygen, hydrogen, water, and nitrogen.

Embodiment 35 provides the method of any one of Embodiments 1-34, further comprising combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the composition in the subterranean formation comprises placing the mixture in the subterranean formation.

Embodiment 36 provides the method of any one of Embodiments 1-35, wherein at least one of prior to, during, and after the placing of the composition in the subterranean formation, the composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

Embodiment 37 provides the method of any one of Embodiments 1-36, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 38 provides the method of any one of Embodiments 1-37, wherein the placing of the composition in the subterranean formation comprises fracturing at least part of the subterranean formation to form at least one subterranean fracture.

Embodiment 39 provides the method of any one of Embodiments 1-38, wherein the composition further comprises a proppant, a resin-coated proppant, or a combination thereof.

Embodiment 40 provides the method of any one of Embodiments 1-39, wherein the placing of the composition in the subterranean formation comprises pumping the composition through a tubular disposed in a wellbore and into the subterranean formation.

Embodiment 41 provides a system for performing the method of any one of Embodiments 1-40, the system comprising:

a tubular disposed in the subterranean formation; and a pump configured to pump the composition in the subterranean formation through the tubular.

Embodiment 42 provides a method of treating a subterranean formation, the method comprising:

placing in a subterranean formation a foam composition comprising about 0.01 wt % to about 10 wt % of an ethoxylated sorbitol ester surfactant, wherein about 16% to about 84% of the alcohol units are ethoxylated, and wherein about 16% to about 84% of the alcohol units are esterified with independently selected ($C_5$-$C_{50}$)fatty acids; and about 0.1 wt % to about 20 wt % of a foam agent comprising an ammonium salt of an ethoxylated ($C_6$-$C_{10}$) alcohol ether sulfate;

about 1 wt % to about 30 wt % of a polysaccharide foam stabilizer;

about 50 wt % to about 90 wt % of a carrier fluid; and about 10 vol % to about 90 vol % of a blowing agent.

Embodiment 43 provides a system comprising:
a foam composition comprising
a blowing agent;
a surfactant; and
at least one of
a foam agent comprising an alkoxylated alcohol ether sulfate, and
a polysaccharide foam stabilizer; and
a subterranean formation comprising the composition therein.

Embodiment 44 provides the system of Embodiment 43, further comprising
a tubular disposed in the subterranean formation; and
a pump configured to pump the composition in the subterranean formation through the tubular.

Embodiment 45 provides a foam composition for treatment of a subterranean formation, the foam composition comprising:
a blowing agent;
a surfactant; and
at least one of
a foam agent comprising an alkoxylated alcohol ether sulfate, and
a polysaccharide foam stabilizer;
wherein the foam composition is a foam.

Embodiment 46 provides the composition of Embodiment 45, wherein the composition further comprises a downhole fluid.

Embodiment 47 provides a method of preparing a composition for treatment of a subterranean formation, the method comprising:
forming a foam composition comprising
a blowing agent;
a surfactant; and
at least one of
a foam agent comprising an alkoxylated alcohol ether sulfate, and
a polysaccharide foam stabilizer.

What is claimed is:

1. A method of treating a subterranean formation, comprising:
placing a foam composition into a subterranean formation, the foam composition comprising:
about 10 to about 90 vol. %, based on the total volume of the foam composition, of a blowing agent,
about 0.01 to about 10 wt. %, based on the total weight of the foam composition, of a surfactant,
about 0.1 to about 20 wt. %, based on the total weight of the foam composition, of a foam agent comprising an alkoxylated alcohol ether sulfate, and
about 1 to about 30 wt. %, based on the total weight of the foam composition, of a polysaccharide foam stabilizer.

2. The method of claim 1, wherein the foam composition comprises about 0.1 wt % to about 2 wt % of the surfactant.

3. The method of claim 1, wherein the surfactant comprises a ($C_1$-$C_4$)alkylated ($C_4$-$C_{10}$)hydrocarbon polyol, wherein about 1% to about 99% of the alcohol units of the polyol are alkylated, and wherein about 1% to about 100% of the alcohol units are esterified with independently selected ($C_5$-$C_{50}$)fatty acids.

4. The method of claim 1, wherein the surfactant comprises an ethoxylated sorbitol ester, wherein about 16% to about 99% of the alcohol units are ethoxylated, and wherein about 1% to about 99% of the alcohol units are esterified with independently selected ($C_5$-$C_{50}$)fatty acids.

5. The method of claim 1, wherein the foam agent is about 1 wt % to about 5 wt % of the foam composition.

6. The method of claim 1, wherein the alkoxylated alcohol ether sulfate comprises a ($C_1$-$C_{10}$)alkoxylated ($C_1$-$C_{20}$)alcohol ether sulfate salt foam agent, wherein the ($C_1$-$C_{10}$) alkoxy group and the ($C_1$-$C_{20}$) alcohol are each independently substituted or unsubstituted, and wherein the alkoxylation comprises a degree of polymerization of about 1 to about 10.

7. The method of claim 1, wherein the alkoxylated alcohol ether sulfate comprises a ($C_2$-$C_4$)alkoxylated ($C_6$-$C_{10}$)alcohol ether sulfate salt foam agent, an ammonium salt of an ethoxylated ($C_6$-$C_{10}$) alcohol ether sulfate, or a combination thereof.

8. The method of claim 1, wherein the foam agent further comprises a ($C_1$-$C_{10}$)hydrocarbyl amido ($C_1$-$C_5$)alkylbetaine, and wherein the ($C_1$-$C_{10}$)hydrocarbyl and the ($C_1$-$C_5$)alkyl are independently substituted or unsubstituted.

9. The method of claim 1, wherein the foam agent further comprises lauramidopropyl betaine.

10. The method of claim 1, wherein the foam agent further comprises a ($C_1$-$C_{10}$)hydrocarbyl amido ($C_1$-$C_5$)alkyldimethylamine oxide, and wherein the ($C_1$-$C_{10}$)hydrocarbyl and the ($C_1$-$C_5$)alkyl are independently substituted or unsubstituted.

11. The method of claim 1, wherein the foam agent further comprises lauramidopropyl dimethylamine oxide.

12. The method of claim 1, wherein the foam composition comprises about 10 wt % to about 20 wt % of the polysaccharide foam stabilizer.

13. The method of claim 1, wherein the polysaccharide foam stabilizer comprises $(C_6H_{10}O_5)_n$, wherein $40 \leq n \leq 3000$.

14. The method of claim 1, wherein the foam composition further comprises a carrier fluid, and wherein the carrier fluid comprises xylenes, ethylbenzene, N-methyl pyrrolidine, or any combination thereof.

15. The method of claim 1, wherein the foam composition comprises about 30 vol % to about 70 vol % of the blowing agent.

16. The method of claim 1, wherein the blowing agent comprises at least one of air, a substituted or unsubstituted branched or linear ($C_{1-5}$)alkane, ethane, propane, butane, n-butane, isobutane, pentane, isopentane, cyclopentane, halo ($C_{1-5}$)alkanes, chlorofluorocarbon, CFC-11, CFC-12, hydroflurochlorocarbons, HCFC-22, HCFC-122, HCFC-124, HFC-152a, HFC-143a, HFC-134a, HCFC-141b, HCFC-142b, carbon dioxide, or any combination thereof.

17. The method of claim 1, wherein the foam composition further comprises a proppant, and wherein the placing of the foam composition in the subterranean formation comprises fracturing at least part of the subterranean formation to form at least one subterranean fracture.

18. A system for performing the method of claim 1, the system comprising:
- a tubular disposed in the subterranean formation; and
- a pump configured to pump the foam composition in the subterranean formation through the tubular.

19. A method of treating a subterranean formation, comprising:
- placing a foam composition in a subterranean formation, the foam composition comprising:
  - about 0.01 wt % to about 10 wt % of an ethoxylated sorbitol ester surfactant, wherein about 16% to about 84% of the alcohol units are ethoxylated, and wherein about 16% to about 84% of the alcohol units are esterified with independently selected ($C_5$-$C_{50}$) fatty acids; and
  - about 0.1 wt % to about 20 wt % of a foam agent comprising an ammonium salt of an ethoxylated ($C_6$-$C_{10}$)alcohol ether sulfate;
  - about 1 wt % to about 30 wt % of a polysaccharide foam stabilizer;
  - about 50 wt % to about 90 wt % of a carrier fluid; and
  - about 10 vol % to about 90 vol % of a blowing agent.

20. A foam composition for treatment of a subterranean formation, comprising:
- about 10 to about 90 vol. %, based on the total volume of the foam composition, of a blowing agent;
- about 0.01 to about 10 wt. %, based on the total weight of the foam composition, of a surfactant;
- about 0.1 to about 20 wt. %, based on the total weight of the foam composition, of a foam agent comprising an alkoxylated alcohol ether sulfate; and
- about 1 to about 30 wt. %, based on the total weight of the foam composition, of a polysaccharide foam stabilizer, wherein the foam composition is a foam.

\* \* \* \* \*